(12) United States Patent
Henneberg et al.

(10) Patent No.: US 8,418,821 B2
(45) Date of Patent: Apr. 16, 2013

(54) PISTON-CYLINDER UNIT WITH PISTON ROD PROTECTOR

(75) Inventors: Robert Henneberg, Ilmenau (DE); Frank Partosch, Sand/Main (DE); Simon Strack, Bamberg (DE); Andreas Zietsch, Uechtelhausen-Zell (DE)

(73) Assignee: ZF Friedrichshafen AG, Firedrichshafen (DE)

( * ) Notice: Subject to any disclaimer, the term of this patent is extended or adjusted under 35 U.S.C. 154(b) by 407 days.

(21) Appl. No.: 12/331,534

(22) Filed: Dec. 10, 2008

(65) Prior Publication Data

US 2009/0145707 A1 Jun. 11, 2009

(30) Foreign Application Priority Data

Dec. 11, 2007 (DE) .......................... 10 2007 059 800

(51) Int. Cl.
*F16F 9/38* (2006.01)

(52) U.S. Cl.
USPC .................................................. 188/322.12

(58) Field of Classification Search ............ 188/322.12; 267/64.19, 64.21, 64.23, 64.24, 64.27; 277/634, 277/636

See application file for complete search history.

(56) References Cited

U.S. PATENT DOCUMENTS

| | | | |
|---|---|---|---|
| 4,235,426 A * | 11/1980 | Sullivan et al. ............... | 267/220 |
| 5,402,868 A | 4/1995 | Handke | |
| 6,905,006 B2 * | 6/2005 | Handke et al. ........... | 188/322.12 |
| 7,364,177 B2 | 4/2008 | Handke et al. | |
| 2003/0209395 A1 | 11/2003 | Fukaya | |
| 2004/0168871 A1 | 9/2004 | Handke et al. | |
| 2004/0245691 A1 | 12/2004 | Handke et al. | |
| 2005/0242542 A1 | 11/2005 | Handke et al. | |

FOREIGN PATENT DOCUMENTS

| | | |
|---|---|---|
| CN | 1693103 | 11/2005 |
| DE | 91 09 020 | 10/1991 |
| DE | 102 53 221 | 10/1991 |
| DE | 41 37 447 | 8/2003 |
| DE | 4137447 C2 | 8/2003 |

* cited by examiner

*Primary Examiner* — Robert A Siconolfi
*Assistant Examiner* — Vu Q Nguyen
(74) *Attorney, Agent, or Firm* — Cozen O'Connor

(57) ABSTRACT

Piston-cylinder unit includes a piston rod guided with freedom of axial movement in a cylinder, where at least part of the piston rod is enclosed by a piston rod protector, which is designed with at least limited axial elasticity. At least one retaining surface of the piston rod protector enters into a positive connection with at least one stop surface on the cylinder side, and an auxiliary assembly bevel allows the piston rod protector to buckle over a certain stroke range of the piston rod during the installation of the protector, so that the retaining surface snap-locks onto the stop surface on the cylinder side.

1 Claim, 5 Drawing Sheets

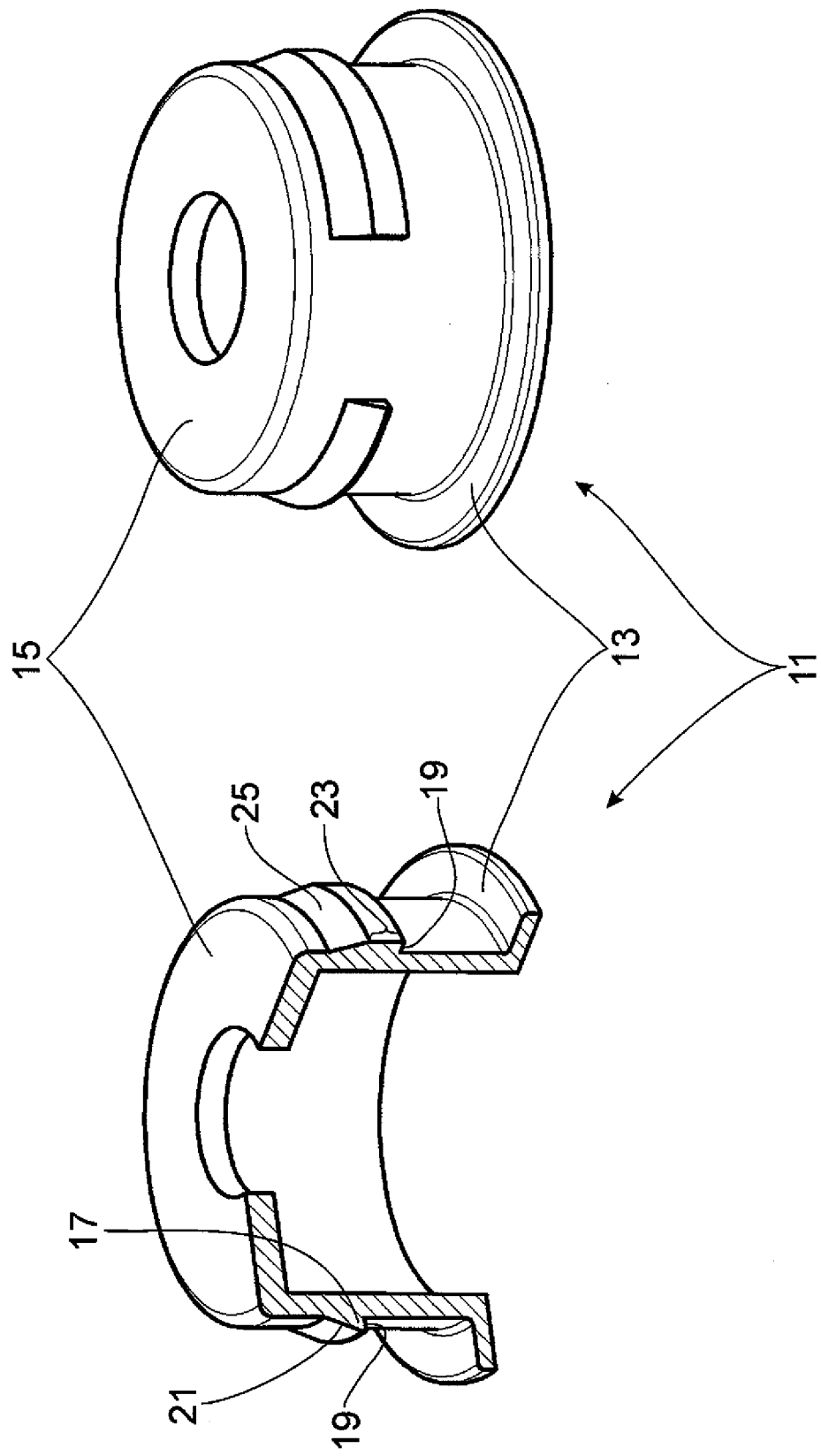

PISTON-CYLINDER UNIT WITH PISTON ROD PROTECTOR

BACKGROUND OF THE INVENTION

1. Field of the Invention

The invention pertains to a piston-cylinder unit with a piston rod protector having a retaining surface which engages a stop surface on the cylinder

2. Description of the Related Art

The piston rod of a piston-cylinder unit, e.g., a vibration damper, should be protected from dirt, because dust and/or moisture can negatively affect the service life of the piston-cylinder unit. For this reason, a piston rod protector, which encloses the piston rod, is very often used. In its simplest form, the piston rod protector consists of a rigid tube, the inside diameter of which is somewhat larger than the cylinder of the vibration damper. An annular gap therefore remains between the cylinder and the inside surface of the piston rod protector, however, so that it is still possible for dirt to intrude.

DE 41 37 447 C2 describes a telescopic shock absorber, which comprises a cap on the end where the piston rod exits; this cap is provided with a circumferential collar. After assembly, the collar fits into a bellows forming one end of the piston rod protector, where the sequence of assembly steps is intended to be automated. U.S. Pat. No. 5,402,868 also describes a piston rod protector, which can be positively connected to a cylindrical tube end cap equipped with stop surfaces.

The problem is that the assembly process is very difficult to automate. When the piston rod protector comes to rest on the retaining surfaces during the inward-threading movement, manual support is often necessary to ensure that the piston rod protector actually does lock onto the stop surfaces. These manual interventions lead to errors or to extra effort.

SUMMARY OF THE INVENTION

An object of the present invention is to improve the design of a piston-cylinder unit in such a way that the assembly problems known from the prior art are eliminated.

According to the invention, the piston-cylinder unit has an auxiliary assembly bevel, which allows the piston rod protector to buckle over a certain stroke range of the piston rod during the installation movement of the protector, so that the retaining surface is locked onto the stop surface on the cylinder side.

During the installation movement, the piston rod protector executes a wobbling movement, starting from the buckled location, and this wobbling movement moves the retaining surface over the minimum of one stop surface on the cylinder side.

In an advantageous embodiment, the stop surface is formed by a radial shoulder, where a primary bevel is formed on the side facing away from the stop surface. The wobbling movement is increased by the primary bevel, which is circumferentially spaced from the auxiliary assembly bevel.

According to an advantageous embodiment, an axial gap is present between the primary assembly bevel and the auxiliary assembly bevel. This gap can be used to determine the buckling behavior of the piston rod protector. The auxiliary assembly bevel also proceeds at an angle to the longitudinal axis of the piston rod and thus makes it possible for the end surface to slide in the direction toward the cylinder.

The primary assembly bevel and the auxiliary assembly bevel are formed on a cap on the cylinder side. The cap is pressed onto the cylinder at the end where the piston rod exits.

To achieve the best possible retaining effect as well as the best possible seal for the piston rod protector, the auxiliary assembly bevel is also formed on a shoulder having a stop surface.

In a variant, the piston rod protector comprises a projection extending from the minimum of one retaining surface in the axial direction of the cylinder. This projection comes to rest on the auxiliary assembly bevel.

The projection can be very easily realized by providing the piston rod protector with an end surface which forms an angle with respect to the longitudinal axis of the cylinder, and which comes to rest on the auxiliary assembly bevel.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIGS. 2 and 3 show the cap in isolation;

DETAILED DESCRIPTION OF THE PRESENTLY PREFERRED EMBODIMENTS

Figure 1:
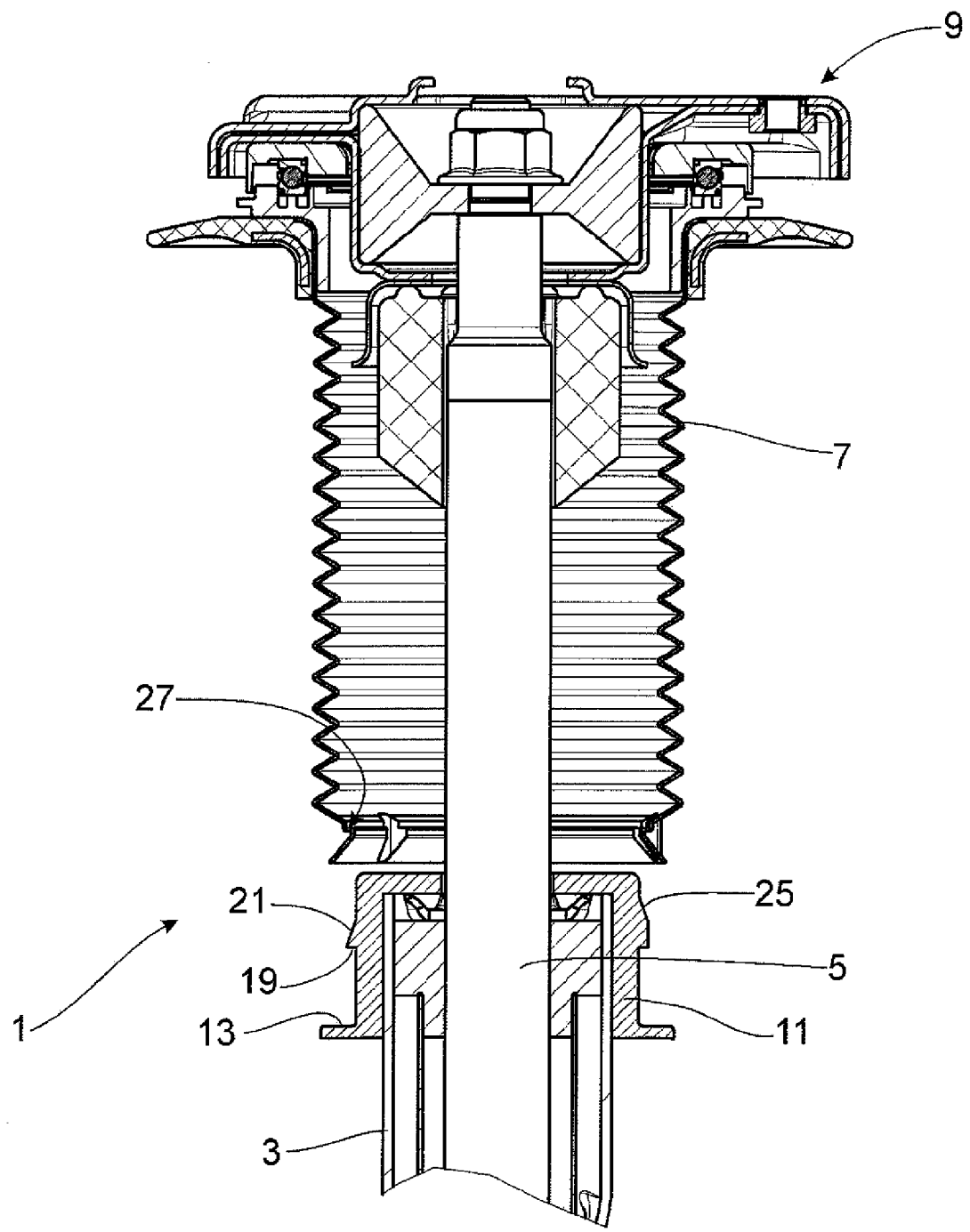
FIG. 1 shows a piston-cylinder unit with a piston rod protector in the first stage of the assembly process.

FIG. 1 shows part of a piston-cylinder unit 1, which includes a cylinder 3, in which a piston rod 5 is guided with freedom of axial movement. A piston rod protector 7 is held in place axially on the piston rod 5 indirectly by way of a connecting bearing 9. The piston rod protector 7 is designed with elasticity over at least a certain portion of its length. According to a preferred embodiment, as shown, the protector has the form of a bellows which can expand and collapse axially.

A cap 11 is mounted on the end of the cylinder 3 at which the piston rod exits. As FIGS. 2 and 3 show, the cap 11 has a circumferential flange 13. A radial shoulder 17 is formed on the circumference of the cap a certain distance away from the flange 13 in the direction toward a cover surface 15. The bottom surface of the shoulder 17 forms a stop surface 19 facing the circumferential flange 13. On the side of the shoulder facing away from the stop surface 19, there is a primary assembly bevel 21. On the radial shoulder 17, circumferentially and axially spaced from the primary assembly bevel 21, there is also an auxiliary assembly bevel 25 extending toward the cover surface 15. This auxiliary bevel 25 also forms a stop surface 19 facing the flange 13.

In the embodiment shown in FIGS. 2 and 3, the primary and auxiliary assembly bevels 21, 25 are on circumferentially spaced segments of the shoulder 17, and the bevel 25 is at a fixed axial distance to the bevel 21. However it is also possible for the segments to be circumferentially continuous, so that the stop surface 19 is continuous, or interrupted only once. In this case it is also possible for the primary bevel 21 to make a continuous helical transition into the auxiliary bevel 25, in the manner of a screw thread.

Figure 3A:
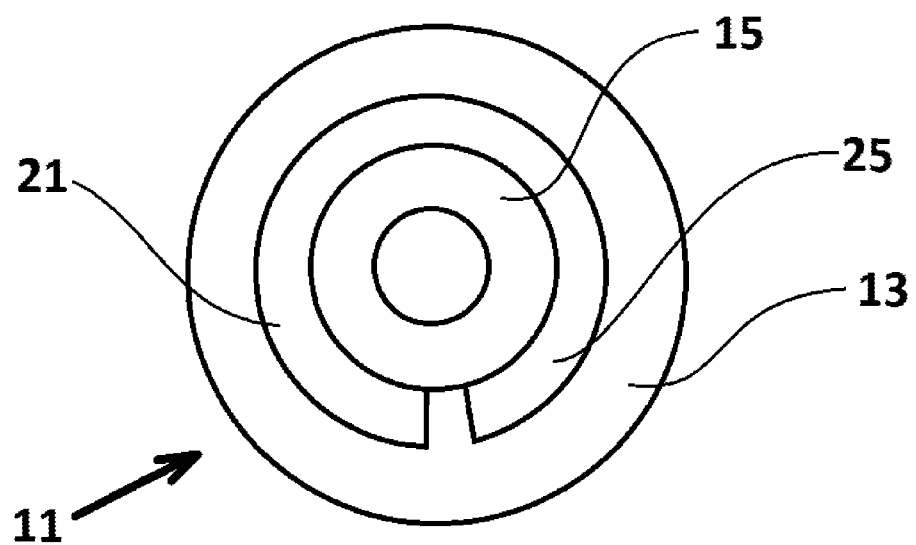
FIG. 3A is a top view of the cap in isolation.
Figure 4:
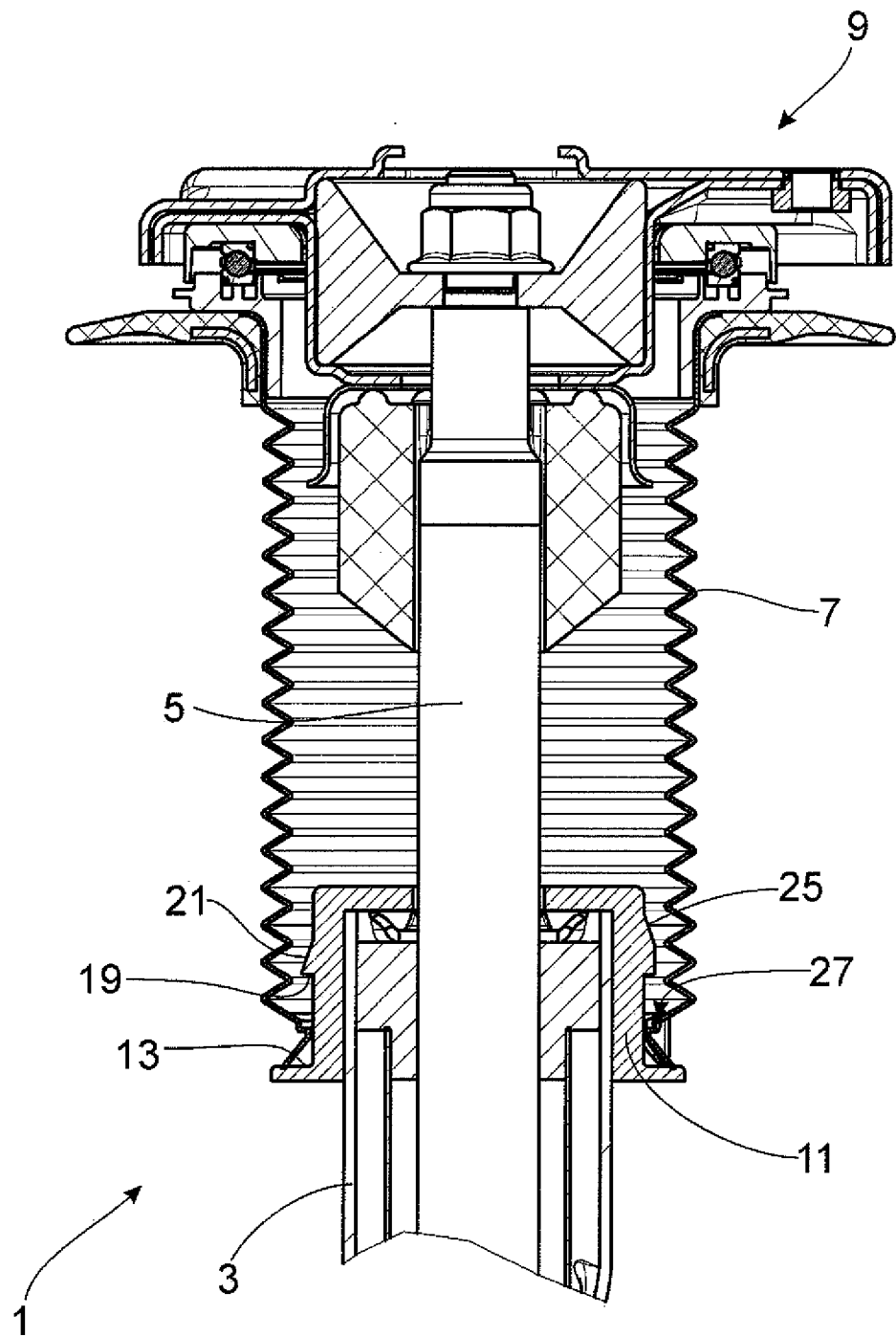
FIG. 4 shows a piston-cylinder unit according to FIG. 1 after final assembly.

FIG. 3A is a top view of the cap 11. As shown, the primary bevel 21 forms a continuous transition into the auxiliary bevel 25. Because the primary bevel 21 and the auxiliary bevel 25 are at different axial positions on the cap 11, the primary bevel 21 makes a continuous helical transition into the auxiliary bevel 25, in the manner of a screw thread.

During the assembly process, the piston rod 5 is pushed into the cylinder 3, and thus the bottom end of the piston rod protector 7 is moved toward the cap 11. One side of at least one of the retaining surfaces 27 on the inside wall of the piston rod protector 7 comes to rest on the auxiliary assembly bevel 25 located axially upstream of the primary assembly bevel 21. As the piston rod is pushed farther inward, the piston rod protector 7 buckles slightly over a certain stroke range, so that the retaining surface 27 slides over the primary assembly bevel 21 and snap-locks onto the stop surface 19. Upon further axial compression of the piston rod protector, the piston rod protector slides past the auxiliary assembly bevel 25 in the direction toward the circumferential flange 13, thus passing over the cylindrical surface forming axial gap 23, and grips the radial shoulder 17 from behind, so that the retaining surface 27 now also comes to rest on the stop surface 19 facing away from the auxiliary assembly bevel 25. Thus the piston rod protector 7 is secured all the way around against any forces which might try to pull the cap 11 away from it. In the inward-travel direction of the piston rod, the piston rod protector 7 is supported on the circumferential flange 13, so that the retaining surface 27 has a certain freedom of axial movement between the stop surface 19 and the circumferential flange 13.

Figure 5:
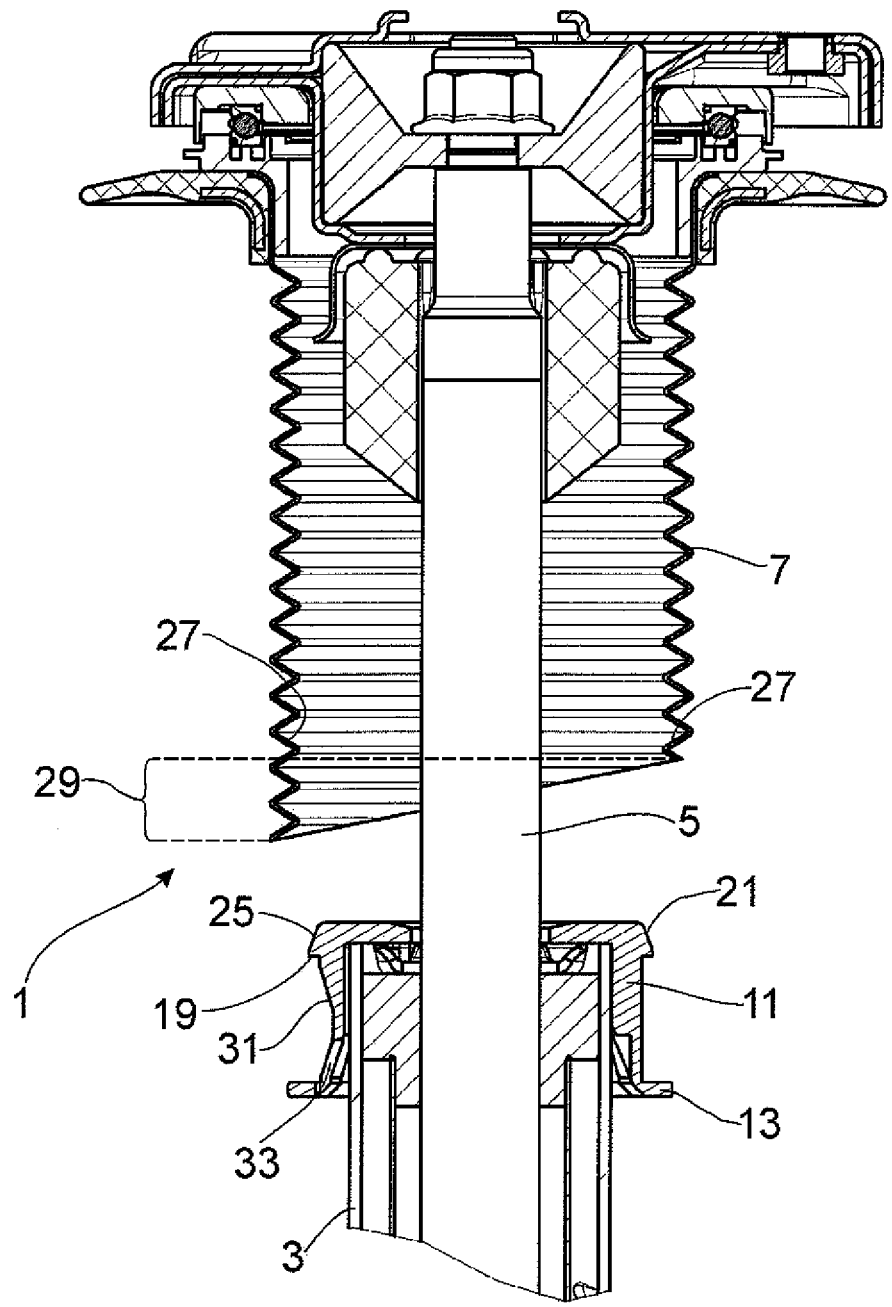
FIG. 5 shows an alternative to FIG. 1.

The variant according to FIG. 5 differs in that the piston rod protector 7 has a projection 29, extending from at least one retaining surface 27 in the axial direction of the cylinder 3; this projection comes to rest on the auxiliary assembly bevel 25. The projection 29 is obtained in that the end surface of the piston rod protector lies in a plane extending at an acute angle to the longitudinal axis of the cylinder and thus comes to rest on the auxiliary assembly bevel 25. Geometrically, the auxiliary assembly bevel 25 and the primary assembly bevel 21 can also coincide, because there is no need for an axial offset between these two surfaces. Under certain conditions, the angle of the primary assembly bevel can be different from that of the auxiliary assembly bevel. In this exemplary embodiment, the cap has an area 31 of reduced diameter in the circumferential area between the stop surface 19 and the circumferential flange 13 to assist the venting of the annular space between the piston rod 5 and the piston rod protector via an opening 33 in the cap 11.

The invention is not limited by the embodiments described above which are presented as examples only but can be modified in various ways within the scope of protection defined by the appended patent claims.

We claim:

1. A piston cylinder unit comprising:
a cylinder;
a piston rod guided axially within the cylinder and extending therefrom;
a piston rod protector surrounding the piston rod and having at least one axially facing retaining surface extending circumferentially inside the protector, the piston rod protector having elasticity; and
an end cap having a radial shoulder extending around at least part of the cylinder, the shoulder having an axially facing stop surface extending circumferentially around at least part of the cylinder, a primary assembly bevel portion facing oppositely from the stop surface, and an auxiliary assembly bevel portion facing oppositely from the stop surface, wherein the primary assembly bevel portion forms a continuous helical transition into the auxiliary assembly bevel portion and is configured to contact the piston rod protector,
wherein the piston rod protector is slideably arranged on the end cap and is retained between and configured to contact the stop surface and a flange axially spaced from the stop surface,
whereby, during installation of the protector, the retaining surface can be moved progressively over the primary and auxiliary assembly bevel portions until the retaining surface engages the stop surface.

\* \* \* \* \*